US010530246B2

(12) United States Patent
Riedl (10) Patent No.: US 10,530,246 B2
(45) Date of Patent: Jan. 7, 2020

(54) CHARGE PUMP CIRCUIT AND METHOD FOR OPERATING A CHARGE PUMP CIRCUIT

(71) Applicant: Infineon Technologies AG, Neubiberg (DE)

(72) Inventor: Christoph Riedl, Villach (AT)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 15/409,178

(22) Filed: Jan. 18, 2017

(65) Prior Publication Data

US 2017/0229956 A1 Aug. 10, 2017

(30) Foreign Application Priority Data

Feb. 4, 2016 (DE) .................. 10 2016 101 998

(51) Int. Cl.
*H02M 3/07* (2006.01)
(52) U.S. Cl.
CPC ................... *H02M 3/07* (2013.01)
(58) Field of Classification Search
CPC .. H02M 3/07; H02M 3/073; H02M 2003/071; H02M 2003/072; H02M 2003/075; H02M 2003/076; H02M 2003/077; H02M 2003/078; G05F 3/30; G05F 3/242; G05F 3/267; G05F 1/461; G05F 3/225; G01K 3/10; G01K 7/01; G11C 5/147; H01S 5/0427; H01S 5/06804; H01S 5/183; H03B 2200/0038
USPC ....................................................... 327/536
See application file for complete search history.

(56) References Cited

U.S. PATENT DOCUMENTS

| | | | |
|---|---|---|---|
| 7,068,094 B1 | 6/2006 | Jamal et al. | |
| 2008/0212347 A1 | 9/2008 | Mok et al. | |
| 2009/0051415 A1 | 2/2009 | Botker et al. | |
| 2010/0201406 A1* | 8/2010 | Illegems | G05F 3/242 327/109 |
| 2011/0248747 A1* | 10/2011 | Huang | G05F 3/30 327/103 |
| 2013/0285722 A1* | 10/2013 | Chou | H03L 7/0898 327/157 |
| 2013/0300385 A1 | 11/2013 | Li et al. | |
| 2015/0043600 A1* | 2/2015 | Ying | H01S 5/06804 372/38.02 |
| 2015/0181352 A1* | 6/2015 | Astgimath | H04R 3/00 381/174 |

(Continued)

FOREIGN PATENT DOCUMENTS

CN 201846231 U 5/2011
CN 103956651 A 7/2014

(Continued)

OTHER PUBLICATIONS

Office Action, in the German language, from counterpart German Application No. 102016101998.4 dated Jun. 16, 2016, 12 pp.

(Continued)

*Primary Examiner* — Patrick C Chen
(74) *Attorney, Agent, or Firm* — Shumaker & Sieffert, P.A.

(57) ABSTRACT

A charge pump circuit is provided, in which a charge pump is supplied with a temperature-dependent bias current, in particular a bias current that decreases with temperature.

20 Claims, 5 Drawing Sheets

(56) References Cited

U.S. PATENT DOCUMENTS

2016/0265983 A1* 9/2016 Hsu .................. G01K 13/00

FOREIGN PATENT DOCUMENTS

| DE | 10351050 A1 | 6/2005 |
|---|---|---|
| JP | 11220872 A | 8/1999 |

OTHER PUBLICATIONS

Office Action, in Chinese language, from counterpart Chinese Patent Application 201710061420.4, dated Sep. 3, 2018, 5 pp.
Office Action, in the Chinese language, from counterpart Chinese Application No. 201710061420.4, dated Jan. 3, 2019, 6 pp.

* cited by examiner

CHARGE PUMP CIRCUIT AND METHOD FOR OPERATING A CHARGE PUMP CIRCUIT

TECHNICAL FIELD

The present application relates to a charge pump circuit, a method for operating such a charge pump circuit and a circuit containing such a charge pump circuit.

BACKGROUND

Charge pumps (CP) are used in many applications to provide higher voltages than a supply voltage. In other words, such charge pumps make it possible to output a higher output voltage based on a lower input voltage. In many charge pump designs, switching transistors are controlled in such a way that a capacitor is charged and discharged periodically. In such designs, the charge pump may generate electromagnetic interference that is caused by currents switching.

In many applications, the switched currents are converted to direct currents in order to reduce such electromagnetic interference and emissions. One or more constant current sources are conventionally used for this purpose. In conventional implementations, the implementation of these constant current sources requires a comparatively large chip surface area in order to limit heating on account of high power losses.

It is an object of the present invention to provide possibilities for implementing such charge pump circuits with a smaller chip surface area.

SUMMARY

A charge pump circuit as claimed in claim 1, a circuit as claimed in claim 11 and a method as claimed in claim 12 are provided. Further embodiments are defined in the dependent claims.

DETAILED DESCRIPTION

Various exemplary embodiments are explained in detail below. It should be noted that these exemplary embodiments serve for illustration only and should not be interpreted as restrictive. A description of an exemplary embodiment having a multiplicity of elements or features should therefore not be interpreted as meaning that all of these elements or features are necessary for implementing exemplary embodiments. Rather, it is possible for other exemplary embodiments to have fewer features or elements and/or alternative features or elements. Furthermore, it is possible for exemplary embodiments to have further features or elements in addition to the features or elements explicitly described or shown, for example features or elements that are conventionally used in charge pump circuits.

Features or elements of various exemplary embodiments may be combined with one another, unless stated otherwise. Modifications and variations that are described for one of the exemplary embodiments may also be applied to other exemplary embodiments.

Electrical connections or couplings may be direct connections or couplings, i.e. connections or couplings without additional elements between them, or indirect connections or couplings, i.e. connections with one or more additional elements between them, provided that this does not significantly change the basic function of the connection or coupling, for example that of transmitting a particular signal, a particular piece of information, a particular current or a particular voltage.

In some exemplary embodiments, a bias current having a predefined temperature dependency is generated for a charge pump. Thus, in some exemplary embodiments in particular, a transistor of a current mirror can be dimensioned to be smaller than in the case of a constant bias current, which reduces a surface area requirement of the circuit on a chip. These and other aspects are explained in more detail below with reference to the figures.

Figure 1:
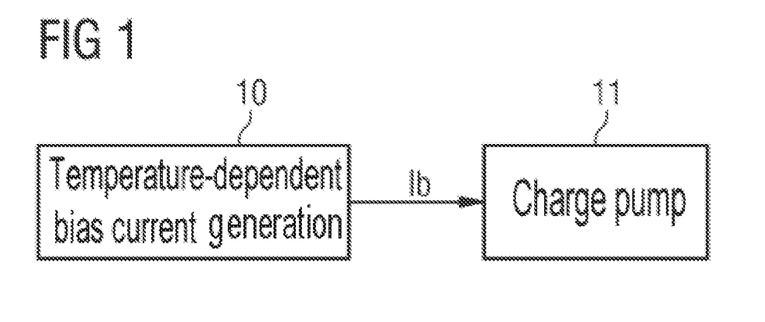
FIG. 1 is a block diagram of a charge pump circuit according to an exemplary embodiment.

FIG. 1 shows a schematic block diagram of a charge pump circuit. The charge pump circuit of FIG. 1 comprises a charge pump 11, also referred to as a charge pump core. The charge pump 11 is supplied with a bias current Ib by a current generating circuit 10. In contrast to conventional charge pump circuits, which use the most temperature-independent bias current possible and in some cases use temperature compensation mechanisms for this, the bias current Ib generated by the current generating device 10 is temperature-dependent. In particular, the current may decrease as the temperature of the charge pump circuit increases. For example, in a temperature range between 0° C. and 150° C. the current may decrease by at least 10%, at least 20%, at least 30% or at least 40%. Other values are also possible depending on the implementation of the charge pump 11. Implementation examples of this are explained in more detail below.

Figure 2:
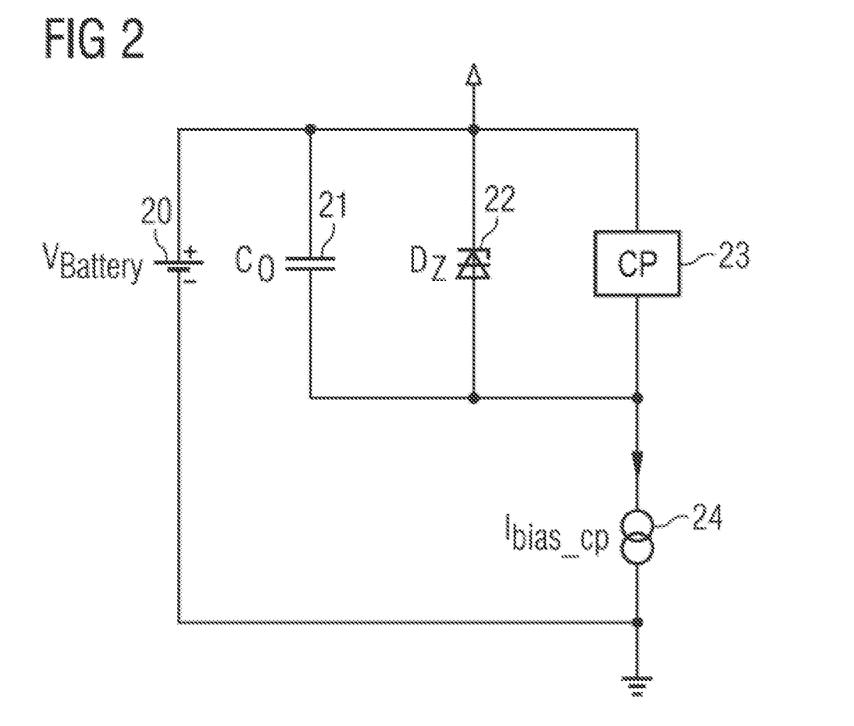
FIG. 2 is a schematic circuit diagram of a charge pump circuit according to an exemplary embodiment.

FIG. 2 shows a charge pump circuit according to an exemplary embodiment. The charge pump circuit of FIG. 2 is arranged between a positive supply voltage and ground, wherein the supply voltage in the example of FIG. 2 is generated by a DC voltage source 20, for example a battery or a storage battery in a mobile device.

A current source 24 generates a bias current in order to be able to turn currents generated by the operation of a charge pump core 23, i.e. switched currents, into a direct current and thus to reduce electromagnetic emissions. A capacitance 21 and a Zener diode 22 are interconnected in parallel with the charge pump core 23, as shown. In conventional implementations, the generated bias current $I_{bias\_cp}$ is constant and at least substantially temperature-independent. In the exemplary embodiment of FIG. 2, however, said current has a temperature dependency as explained above. As will be explained in more detail below, this makes it possible, for example, for a transistor that is used to implement a current mirror in the charge pump circuit to be dimensioned to be smaller than in the conventional case of a temperature-independent constant bias current. An implementation principle using such a current source is explained in more detail in FIG. 3.

Figure 3:
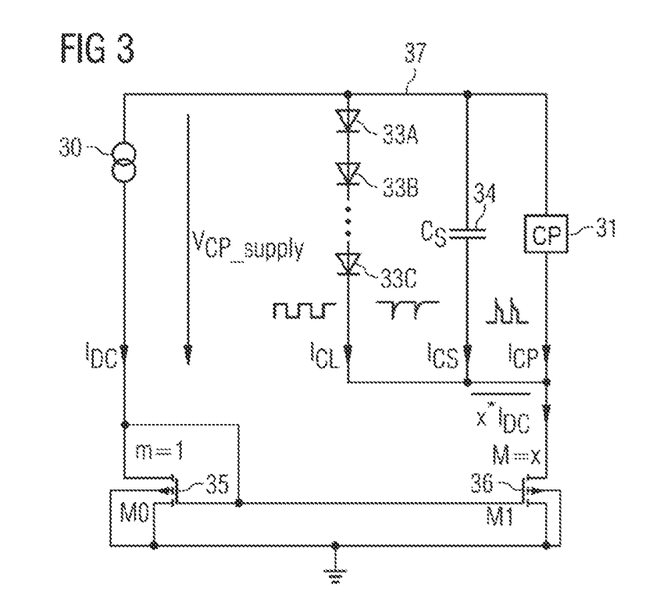
FIG. 3 is a schematic circuit diagram of a charge pump circuit according to an exemplary embodiment.

In the exemplary embodiment of FIG. 3, a current source 30 is arranged between a positive supply voltage 37 and a drain terminal of a transistor 35, the source terminal of said transistor being coupled to ground as shown in FIG. 3. In exemplary embodiments, the current source 30 generates a temperature-dependent current $I_{DC}$, while in conventional charge pump circuits the current $I_{DC}$ is substantially temperature-independent, in particular temperature-compensated. The temperature dependency in exemplary embodiments may be as explained briefly above with reference to FIG. 1 or as described in more detail below.

The current $I_{DC}$ is mirrored by means of current mirrors comprising MOS transistors 35, 36 to form a current $x \cdot I_{DC}$, wherein a size ratio of the transistor 36 (also designated as M1) to the transistor 35 (also designated as M0) corresponds to x. The charge pump circuit further comprises a charge pump core 31 with capacitance 34 connected in parallel therewith and diode chain 33A-33C connected in parallel therewith. While three diodes 33A-33C are shown in the diode chain, this should be understood as merely an example and the number of diodes may vary according to the type of diode and the dimensioning.

A supply voltage $V_{CP\_supply}$ is applied by means of this parallel connection of charge pump core 31, capacitance 34 and diode chain 33A-33C. During operation, the charge pump core 31 generates, by means of switching, a current $I_{CP}$, in this case a current $I_{CS}$ flows through the capacitance 34 and a current $I_{CL}$ flows through the diode chain. These currents add up and have "supplemented" by means of the current source 30 and the current mirror 35, 36 to form the current $x \cdot I_{DC}$ such that overall a direct current is generated. Example waveforms of the respective currents are shown in FIG. 3 by means of the designations $I_{CL}$, $I_{CS}$ and $I_{CP}$. These waveforms serve only for illustration and may vary depending on implementation. The capacitance 34 may also be omitted in some cases. In this case, the current $x \cdot I_{DC}$ must be dimensioned so as to always be higher than $I_{CP}$ so that the supply voltage $V_{CP\_supply}$ remains stable. Using the capacitance 34 contributes to making it possible to select $x \cdot I_{DC}$ to be smaller since the current through the capacitance 34 reduces the peaks of the current $I_{CP}$ overall. It is therefore possible with the aid of the capacitance 34 to reduce the current $x \cdot I_{DC}$ and thus also the surface area required for the transistor 36, wherein, in return, surface area is added for the capacitance 34. Since $I_{CP}$ may nevertheless have high peak values, there is a high surface area requirement in order to limit heating of the transistor 36, in particular in conventional solutions.

The surface area of the transistor 36 is preferably selected such that heating of the transistor 36 due to the flow of current is limited to an acceptable value. It is for this reason that the transistor 36 requires a comparatively large surface area, in particular in conventional implementations in which the current source 30 delivers a constant current. As can be explained in more detail below, providing a temperature-dependent current $I_{DC}$ makes it possible to reduce a required surface area for the transistor 36, as in exemplary embodiments.

Figure 4:
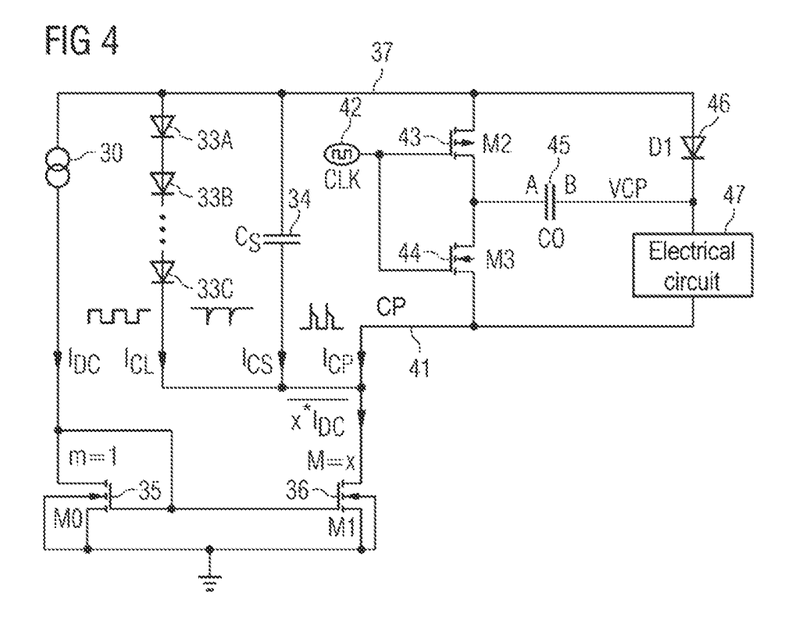
FIG. 4 is a circuit diagram of a charge pump circuit according to an exemplary embodiment.

In order to explain how the current $I_{CP}$ is generated with peaks, as shown schematically in FIG. 3, FIG. 4 shows a circuit diagram of a charge pump circuit according to an exemplary embodiment, which charge pump circuit shows an example of the charge pump core 31 of FIG. 3. Elements of FIG. 4 that correspond to elements of FIG. 3 bear the same reference numerals and are not explained again in more detail.

In the exemplary embodiment of FIG. 4, the charge pump is coupled between the positive supply voltage 37 and a second supply voltage 41, smaller than the first supply voltage 37. The supply voltage may be provided for example by means of a battery as shown in FIG. 2. The charge pump core comprises a transistor 43 (also designated by M2) and a transistor 44 (also designated by M3). In the exemplary embodiment of FIG. 4, the transistor 43 is a P-channel MOSFET (PMOS), whereas the transistor 44 is an N-channel MOSFET. Gate terminals of the transistors 43, 44 are connected to a clock source 42, which delivers a square-wave signal. As a result, the transistors 43, 44 are switched on alternately.

A node between the transistors 43, 44 is connected to a first terminal of a capacitance 45. A voltage $V_{CP}$ that is higher than the supply voltage 37 can then be tapped at a second terminal of the capacitance 45. The second terminal of the transistor 45 is additionally connected to the supply voltage 37 via a diode 46. The diode 46 represents an ideal switch, which allows a flow of current in only one direction in order to charge the second terminal of the capacitance 45 to the supply voltage 37. This charge pump circuit makes it possible, for example, to supply an appropriate voltage to an electrical circuit 47 that requires a higher voltage than the supply voltage 37. In this case, alternately switching the transistors 43, 44 gives rise to the current $I_{CP}$ with the peaks as shown. In particular, during discharge of the capacitance 45 (in order to supply power to the circuit 47) the transistor 44 causes current peaks that may lie in the milliamp region.

Figure 5:
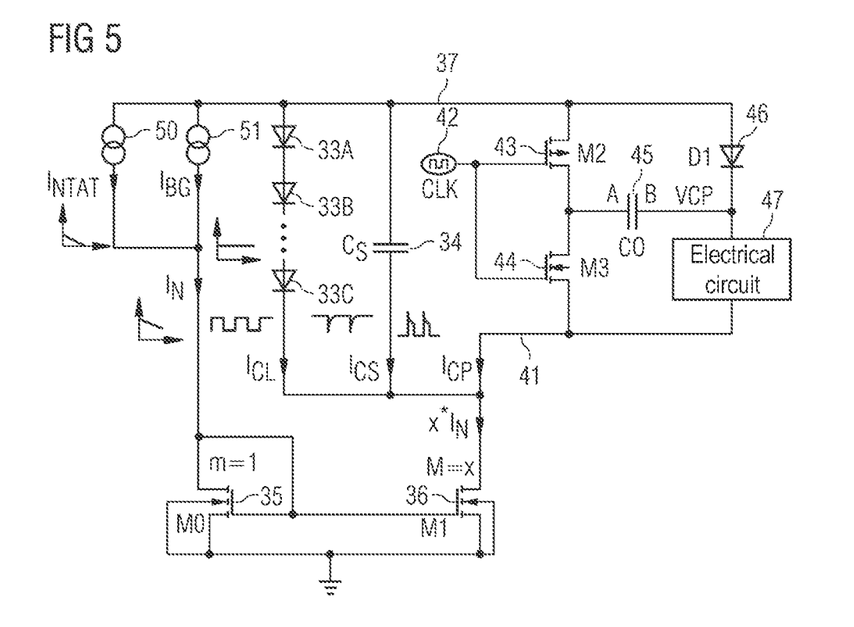
FIG. 5 is a circuit diagram of a charge pump circuit according to an exemplary embodiment.

FIG. 5 shows a circuit diagram according to a further exemplary embodiment, showing in more detail how a temperature-dependent current is provided (for example by the current source 30 of FIG. 4).

In the exemplary embodiment of FIG. 5, the current source 30 of FIG. 4 has been replaced with two current sources 50, 51. Apart from this, the exemplary embodiment of FIG. 5 corresponds to the exemplary embodiment of FIG. 4 and identical elements are designated by the same reference numerals and are not explained again.

In the exemplary embodiment of FIG. 5, the current source 51 delivers a constant current $I_{BG}$, while the current source 50 delivers a current that has a negative temperature coefficient and that in particular may be proportional to the absolute temperature with a negative proportionality factor. This current is designated as $I_{NTAT}$ (Negative To Absolute Temperature). The currents $I_{BG}$ and $I_{NTAT}$ from the current sources 51 and 50 respectively are added in order to obtain a temperature-dependent bias current $I_N$, which corresponds to the NTAT current $I_{NTAT}$ from the current source 50 with a DC offset $I_{BG}$.

Figure 6:
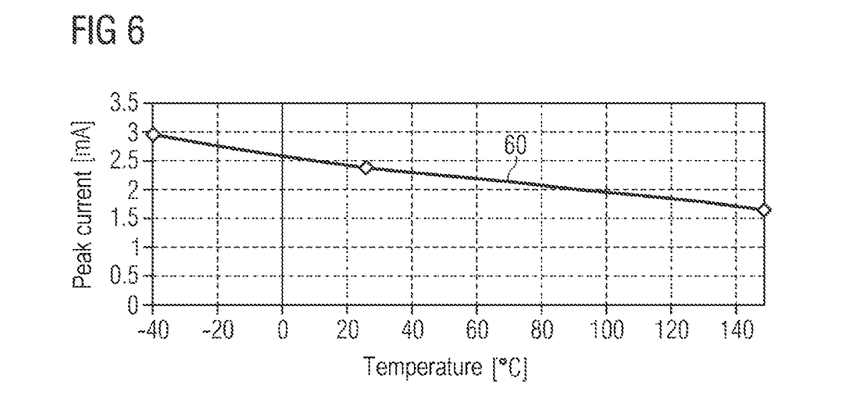
FIGS. 6-8 are graphs to explain the functioning of exemplary embodiments.

The reason why a temperature-dependent current of this kind can be used and therefore a surface area saving, in particular, for the transistor M1 can be achieved is explained in more detail below with reference to FIGS. 6-8.

The peak current $I_{CP}$ generated by the transistor 44 is relatively highly temperature-dependent. FIG. 6 shows a curve 60 of said peak current against the temperature in ° C. It can be seen that said current decreases comparatively distinctly against the temperature, from approximately 3 mA at temperatures of −40° C. to approximately 2 mA at approximately 90° C. This is because the drain current of a transistor such as the transistor 44 generally decreases as the temperature increases if the transistor is operated above a temperature-stable operating point condition. The peak current shown in FIG. 6 therefore also shows a decreasing behavior.

As explained above, a relatively large current through the transistor 36 ($x \cdot I_N$) is required, in particular, in order to be able to compensate for peaks in the current $I_{CP}$. If said peak current decreases as the temperature increases, as shown in FIG. 4, a lower current $x \cdot I_N$ is also required as the temperature increases.

Figure 7:
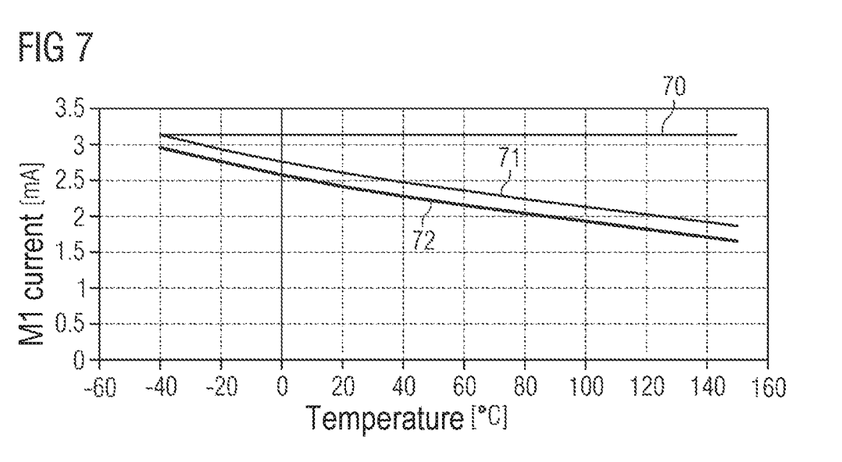

This is illustrated in FIG. 7. A curve 72 in FIG. 7 indicates the required current through the transistor 36. A curve 70 indicates a current that needs to be provided if, as in conventional charge pump circuits, a constant-temperature bias current is used (for example if the current source 30 of FIGS. 3 and 4 delivers a constant-temperature bias current). A curve 71 shows an example of the current that can be used in exemplary embodiments of the invention. Said current decreases as the temperature increases, but is always at a certain safety distance above the required current 72. It should be noted that in exemplary embodiments the bias current is constant at constant temperature.

In exemplary embodiments, the transistor 36 can be dimensioned to be smaller by using said temperature-dependent current. This is because it is generally necessary to dimension the transistor in such a way that the temperature increase is limited and in particular that a maximum temperature at which the transistor works correctly and is not damaged is not exceeded. If the temperature of the transistor is already high, only a comparatively smaller temperature increase can therefore occur than if the temperature of the transistor is low. However, the heating here is lower because a lower current flows through the transistor at higher temperatures in exemplary embodiments, as explained with reference to FIG. 7. The transistor can therefore be dimensioned to be smaller. This is explained in more detail with reference to FIG. 8.

Figure 8:
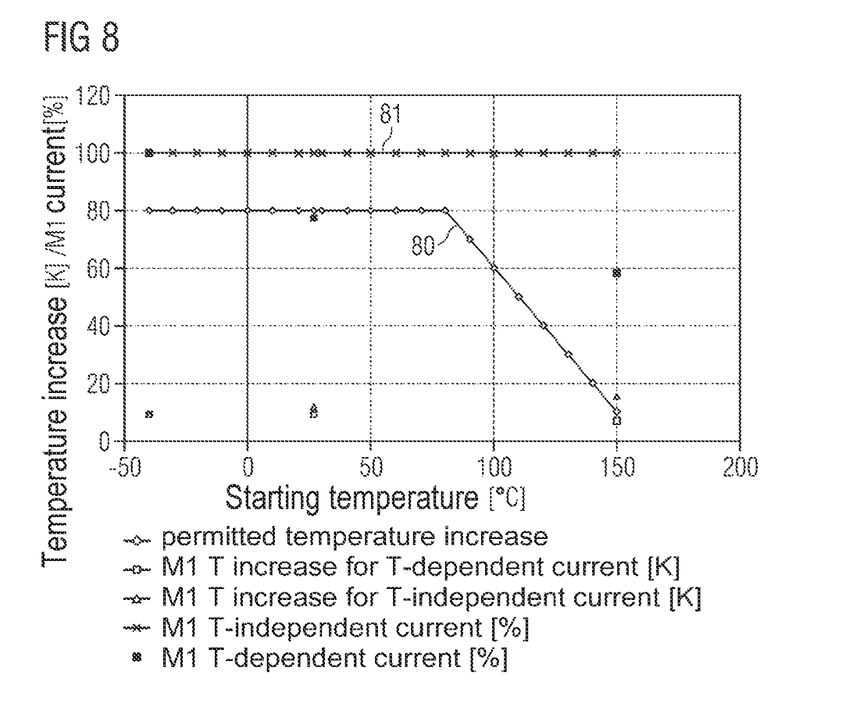

A curve 80 in FIG. 8 designates a permitted temperature increase for an exemplary transistor 36. In this case, it is a requirement, for example, that the temperature increase of the transistor at 150° C. must not exceed 10 K. A curve 81 shows a temperature-independent current as is used in conventional charge pump circuits. In addition, individual points are plotted that show a temperature-dependent current for exemplary temperatures, as is used in exemplary embodiments. The temperature increase for the transistor both for the temperature-dependent current and for the temperature-independent current is also shown for these temperatures. As can be seen, for example at 150° C. the temperature increase with the temperature-dependent current lies below the curve 80, while it lies above the curve 80 for the temperature-independent current, as is used in conventional charge pump circuits. In the case of the constant current (curve 81), as is used in conventional charge pump circuits, the surface area of the transistor 36 therefore has to be enlarged accordingly in order to reduce the temperature increase. Conversely, a transistor with smaller dimensions may therefore be used in exemplary embodiments of the invention. In some examples, a surface area reduction for the transistor 36 in the region of 40-50%, for example approximately 45%, may be achieved here, which may for example lead to a surface area saving of approximately 3-4% for an entire charge pump circuit. For example, in the case of a constant bias current, a transistor surface area may be approximately 17 000 µm², whereas with the temperature-dependent bias current it is smaller than 10 000 µm², e.g. only needs to be approximately 9000 µm². However, these numerical values are to be understood only as an example and as being for illustrative purposes, which in some cases is possible only when using exemplary embodiments. Other numerical values may also apply depending on the implementation and exemplary embodiment.

Figure 9:
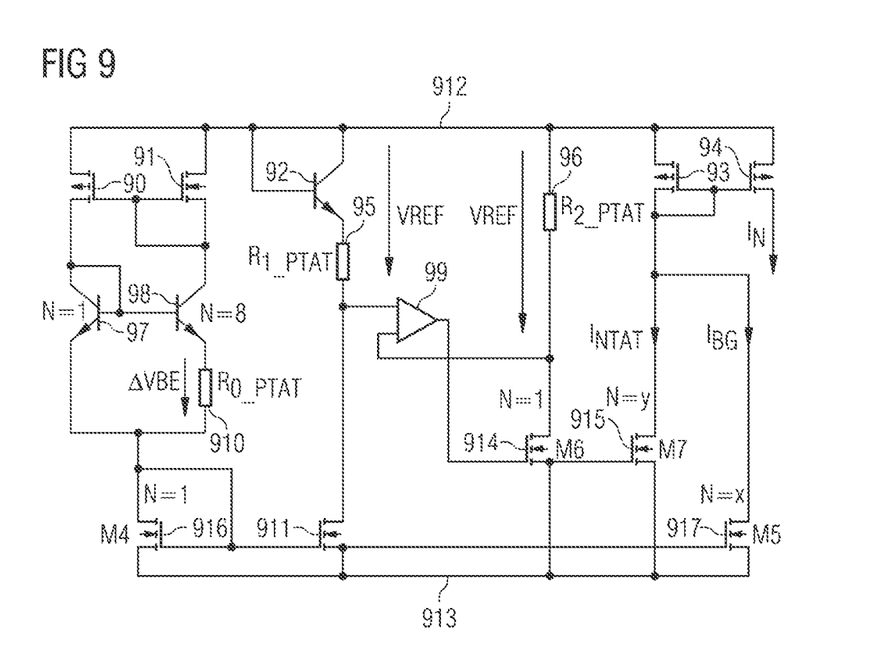
FIG. 9 is a circuit diagram of a charge pump circuit according to an exemplary embodiment.

Next, an exemplary embodiment is explained with reference to FIG. 9, which shows in particular a possible circuit implementation of the current sources 50, 51 from FIG. 5 for generating the currents $I_{NTAT}$, $I_{BG}$ and the summed current $I_N$. The circuit of FIG. 9 is coupled between a positive supply voltage 912 and a lower supply voltage 913, for example ground. The supply voltage 912 may correspond for example to the supply voltage 37 of FIG. 5 and the lower voltage 913 may correspond to ground.

The circuit of FIG. 9 comprises PMOS transistors 90, 91, 93, 94, NMOS transistors 914, 915, 916, 911 and 917, bipolar transistors 92, 97 and 98 and a differential amplifier 99, which are interconnected as shown in FIG. 9. The transistors 93 and 94 and 916 and 917 respectively are interconnected as current mirrors, in particular. Furthermore, the transistors 914 and 915 are controlled by means of the differential amplifier 99 and have a size ratio of y (transistor 915, also designated as M7) to 1 (transistor 914, also designated as M6). This size ratio makes it possible to set a magnitude of the current $I_{NTAT}$. The size ratio of the transistors 917 (also designated as M5) and 916 (also designated as M4) is x:1. This size ratio makes it possible to set the magnitude of the temperature-independent current $I_{BG}$. The currents $I_{NTAT}$ and $I_{BG}$ are summed and then output via the current mirror 93, 94 as current $I_N$.

The circuit of FIG. 9 additionally comprises temperature-dependent positive temperature coefficient (PTAT, Positive To Absolute Temperature) resistors 95, 96, 910. $V_{REF}$ designates a bandgap reference voltage. The resistors 95, 96, 910 may be implemented in any conventional manner known per se.

The current $I_{BG}$ is substantially generated by the PMOS transistors 90, 91, the bipolar transistors 97, 98, which have a size ratio of 1:8 in the example shown a different size ratio being able to be used in other exemplary embodiments), and the resistor 910 and then switched by means of the current mirror 916, 917. A voltage $\Delta VBE$ is dropped across the resistor 910 by means of the switching elements 90, 91, 97, 98, said voltage having a positive temperature dependency due to the temperature dependency of the bandgap voltage and the switching elements used. Together with the temperature dependency of the resistor 910, which is likewise positive, an at least substantially temperature-independent current $I_{BG}$ is produced, since a voltage drop with a positive temperature coefficient across a positive temperature coefficient resistor produces a substantially temperature-independent current, if the temperature coefficients are correspondingly coordinated with one another.

The current $I_{NTAT}$ with a negative temperature coefficient is substantially generated in that the bandgap reference voltage $V_{REF}$ is applied across the positive temperature coefficient resistor 96, said voltage being substantially generated by means of the transistor 911, which forms a further current mirror with the transistor 916, the transistor 92 and the resistor 95. By means of the switching by the differential amplifier 99, the bandgap voltage is then applied across the resistor 96, and the current $I_{NTAT}$ is accordingly set by means of the transistors 914, 915.

The current $I_N$ with the desired temperature properties can be generated in this way and can then be used in the circuit of FIG. 5. However, the circuit of FIG. 9 should be understood as an example only and it is also possible to use other circuits that deliver currents with the desired temperature response.

Figure 10:
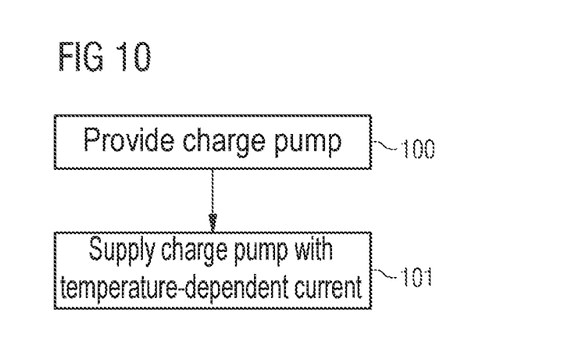
FIG. 10 is a flow chart to illustrate a method according to an exemplary embodiment.

FIG. 10 shows a flow chart to illustrate a method according to an exemplary embodiment. All variations, characteristics and modifications discussed with reference to the devices of FIGS. 1-9 can also be applied to the method of FIG. 10. In particular, the method of FIG. 10 can be carried out by means of the devices discussed above.

A charge pump is provided in a step 100 of FIG. 10. The charge pump can be implemented as described above, for example.

In a step 101, the charge pump is then supplied with a temperature-dependent bias current in order to reduce electromagnetic emissions, for example. The current may in particular decrease here as the temperature increases, and may have a DC component and a component that is negatively proportional to the absolute temperature, in particular, as described above. That is to say that the temperature-dependent current may for example be described by an equation $I(T)=I0-a\cdot T$, where $I(T)$ is the temperature-dependent current, $I0$ is the DC current component and $a$ is a positive proportionality factor.

In this case, the temperature dependency may in particular be such that between 0° C. and 100° C. the current decreases by at least 10%, at least 20%, at least 30% or at least 40%.

The above exemplary embodiments serve merely for illustration and other implementations are also possible.

The invention claimed is:

1. A charge pump circuit comprising:
a charge pump configured to:
receive a first supply voltage, wherein the first supply voltage is a positive supply voltage;
receive a second supply voltage, wherein the second supply voltage is smaller than the first supply voltage; and
generate a voltage signal that is a higher voltage magnitude than a magnitude of the first supply voltage with respect to the second supply voltage;
a current generating circuit for generating a bias current for the charge pump; and
a first current mirror including:
a first transistor configured to conduct the bias current generated by the current generating circuit; and
a second transistor electrically connected to the charge pump and configured to conduct a mirrored current to sink current from the charge pump, wherein the mirrored current is based on the bias current,
wherein the current generating circuit is configured to generate the bias current in such a way that the bias current decreases as an absolute temperature of the charge pump circuit increases.

2. The charge pump circuit of claim 1, wherein the current generating circuit is configured to generate the bias current in such a way that, between 0° C. and 100° C., the bias current decreases by at least 10%.

3. The charge pump circuit of claim 1, wherein the current generating circuit is configured to generate the bias current in such a way that, between 0° C. and 100° C., the bias current decreases by at least 20%.

4. The charge pump circuit of claim 1, wherein the current generating circuit is configured in such a way that the bias current has a temperature-independent component and a component that is proportional to the absolute temperature of the charge pump circuit with a negative proportionality coefficient.

5. The charge pump circuit of claim 1,
wherein the first transistor is electrically connected on a current generating circuit side of the charge pump circuit,
wherein the second transistor is electrically connected on a charge pump side of the charge pump circuit,
wherein the second transistor is larger than the first transistor, and
wherein a surface area of the second transistor on a chip is smaller than 10 000 $\mu m^2$.

6. The charge pump circuit of claim 1, wherein the current generating circuit for generating the bias current comprises a positive temperature coefficient resistor, across which a bandgap reference voltage is applied.

7. The charge pump circuit of claim 6, wherein the bandgap reference voltage is temperature-stabilized.

8. The charge pump circuit of claim 6, wherein the current generating circuit comprises a further circuit part for generating a substantially temperature-independent current.

9. The charge pump circuit of claim 1,
wherein the current generating circuit comprises a second current mirror including:
a third transistor configured to conduct a temperature-dependent current having a temperature-independent component and a component that is proportional to the absolute temperature of the charge pump circuit with a negative proportionality coefficient; and
a fourth transistor configured to conduct the bias current based on the temperature-dependent current.

10. The charge pump circuit of claim 9,
wherein the charge pump is configured to generate the voltage signal based on the first supply voltage and the mirrored current conducted by the second transistor,
wherein the third transistor is configured to conduct the temperature-dependent current based on the first supply voltage, and
wherein the fourth transistor is configured to conduct the bias current based on the temperature-dependent current and further based on the first supply voltage.

11. The charge pump circuit of claim 9, wherein the current generating circuit for generating the bias current comprises a positive temperature coefficient resistor, across which a temperature-stabilized bandgap reference voltage is applied.

12. A circuit comprising:
a charge pump circuit comprising:
a charge pump configured to:
receive a first supply voltage, wherein the first supply voltage is a positive supply voltage;
receive a second supply voltage, wherein the second supply voltage is smaller than the first supply voltage; and
generate a voltage signal that is a higher voltage magnitude than a magnitude of the first supply voltage with respect to the second supply voltage;
a current generating circuit for generating a bias current for the charge pump, wherein the current generating circuit is configured to generate the bias current in such a way that the bias current decreases as an absolute temperature of the charge pump circuit increases;
a first current mirror including:
a first transistor configured to conduct the bias current generated by the current generating circuit; and
a second transistor electrically connected to the charge pump and configured to conduct a mirrored current to sink current from the charge pump, wherein the mirrored current is based on the bias current; and a circuit part coupled to the charge pump in order to be supplied with the voltage signal generated by the charge pump.

13. The circuit of claim 12,
wherein the current generating circuit comprises a second current mirror including:
  a third transistor configured to conduct a temperature-dependent current having a temperature-independent component and a component that is proportional to the absolute temperature of the charge pump circuit with a negative proportionality coefficient; and
  a fourth transistor configured to conduct the bias current based on the temperature-dependent current.

14. The circuit of claim 13, wherein the current generating circuit for generating the bias current comprises a positive temperature coefficient resistor, across which a temperature-stabilized bandgap reference voltage is applied.

15. A method comprising:
  delivering a first supply voltage to a charge pump, wherein the first supply voltage is a positive supply voltage;
  delivering a second supply voltage to the charge pump, wherein the second supply voltage is smaller than the first supply voltage;
  generating a temperature-dependent bias current;
  delivering the temperature-dependent bias current to a first transistor of a first current mirror; and
  supplying the charge pump with a mirrored current to cause the charge pump to generate a voltage signal that is a higher voltage magnitude than a magnitude of the first supply voltage with respect to the second supply voltage,
  wherein the mirrored current is based on the temperature-dependent bias current,
  wherein the temperature-dependent bias current decreases as an absolute temperature of the charge pump increases, and
  wherein supplying the charge pump with the temperature-dependent bias current comprises conducting the mirrored current through a second transistor of the first current mirror to sink current from the charge pump.

16. The method of claim 15, wherein between 0° C. and 100° C., the bias current decreases by at least 10%.

17. The method of claim 15, wherein between 0° C. and 100° C., the bias current decreases by at least 20%.

18. The method of claim 15, wherein the temperature-dependent bias current has a temperature-independent component and a component that is proportional to the absolute temperature of the charge pump with a negative proportionality coefficient.

19. The method of claim 15,
  wherein the method is carried out with a charge pump circuit comprising the charge pump and a current generating circuit for generating the bias current for the charge pump, and
  wherein the current generating circuit comprises the first current mirror.

20. The method of claim 15, wherein generating the temperature-dependent bias current comprises:
  generating, by a third transistor of a second current mirror and based on the first supply voltage, a temperature-dependent current having a temperature-independent component and a component that is proportional to the absolute temperature of the charge pump with a negative proportionality coefficient; and
  generating, by a fourth transistor of the second first current mirror and based on the first supply voltage, the temperature-dependent bias current based on the temperature-dependent current.

* * * * *

UNITED STATES PATENT AND TRADEMARK OFFICE
CERTIFICATE OF CORRECTION

PATENT NO. : 10,530,246 B2
APPLICATION NO. : 15/409178
DATED : January 7, 2020
INVENTOR(S) : Christoph Riedl Page 1 of 1

It is certified that error appears in the above-identified patent and that said Letters Patent is hereby corrected as shown below:

In the Claims

Column 10, Claim 20, Line 33: "...of the second first..." should be replaced with --...of the second...--

Signed and Sealed this
Twenty-seventh Day of October, 2020

Andrei Iancu
*Director of the United States Patent and Trademark Office*